US010275542B2

(12) United States Patent
Ruehl et al.

(10) Patent No.: US 10,275,542 B2
(45) Date of Patent: Apr. 30, 2019

(54) CONFIGURATION TOOL FOR CONFIGURING A MODEL OF A TECHNICAL SYSTEM

(71) Applicant: dSPACE digital signal processing and control engineering GmbH, Paderborn (DE)

(72) Inventors: Martin Ruehl, Altenbeken (DE); Andreas Pillekeit, Dortmund (DE); Frank Mertens, Bad Lippspringe (DE)

(73) Assignee: DSPACE DIGITAL SIGNAL PROCESSING AND CONTROL ENGINEERING GMBH, Paderborn (DE)

( * ) Notice: Subject to any disclaimer, the term of this patent is extended or adjusted under 35 U.S.C. 154(b) by 1189 days.

(21) Appl. No.: 13/957,463

(22) Filed: Aug. 2, 2013

(65) Prior Publication Data

US 2015/0039283 A1 Feb. 5, 2015

(51) Int. Cl.
*G06F 9/455* (2018.01)
*G06F 17/50* (2006.01)
*G06F 15/78* (2006.01)

(52) U.S. Cl.
CPC .............. *G06F 17/50* (2013.01); *G06F 9/455* (2013.01); *G05B 2219/23258* (2013.01); *G05B 2219/23292* (2013.01); *G06F 15/7867* (2013.01); *G06F 2217/02* (2013.01)

(58) Field of Classification Search
None
See application file for complete search history.

(56) References Cited

U.S. PATENT DOCUMENTS

| 4,658,375 | A | * | 4/1987 | Onogi et al. | 710/2 |
|---|---|---|---|---|---|
| 5,819,068 | A | * | 10/1998 | Hasse | 703/6 |
| 5,862,231 | A | * | 1/1999 | Tokuhisa | 381/61 |
| 7,761,802 | B2 | | 7/2010 | Shah et al. | |
| 7,890,868 | B2 | | 2/2011 | Shah et al. | |
| 2006/0122845 | A1 | * | 6/2006 | Denford et al. | 705/1 |
| 2007/0244672 | A1 | * | 10/2007 | Kjaer | 703/2 |
| 2008/0091279 | A1 | * | 4/2008 | Biermann et al. | 700/17 |
| 2014/0006959 | A1 | * | 1/2014 | Huliyar et al. | 715/736 |

OTHER PUBLICATIONS

U.S. Appl. No. 13/466,261, filed May 8, 2012.

* cited by examiner

*Primary Examiner* — Kibrom K Gebresilassie
(74) *Attorney, Agent, or Firm* — Leydig, Voit & Mayer, Ltd.

(57) ABSTRACT

A configuration tool includes a tangible, non-transitory computer-readable medium having computer-executable instructions for configuring a model of a technical system and displaying the model on a display connected to a computer. The model includes at least two model components. Each model component has at least one port. Each model component is displayable in an expanded component representation on the display. The at least one port of each model component is connectable to at least one port of another model component by port association lines. Each model component is displayable in an expanded line representation on the display along with the at least one port and the port association lines of each model component. At least for one selected model component the port association lines connected to ports of the selected model component can be selected to be displayed in a reduced line representation.

12 Claims, 22 Drawing Sheets

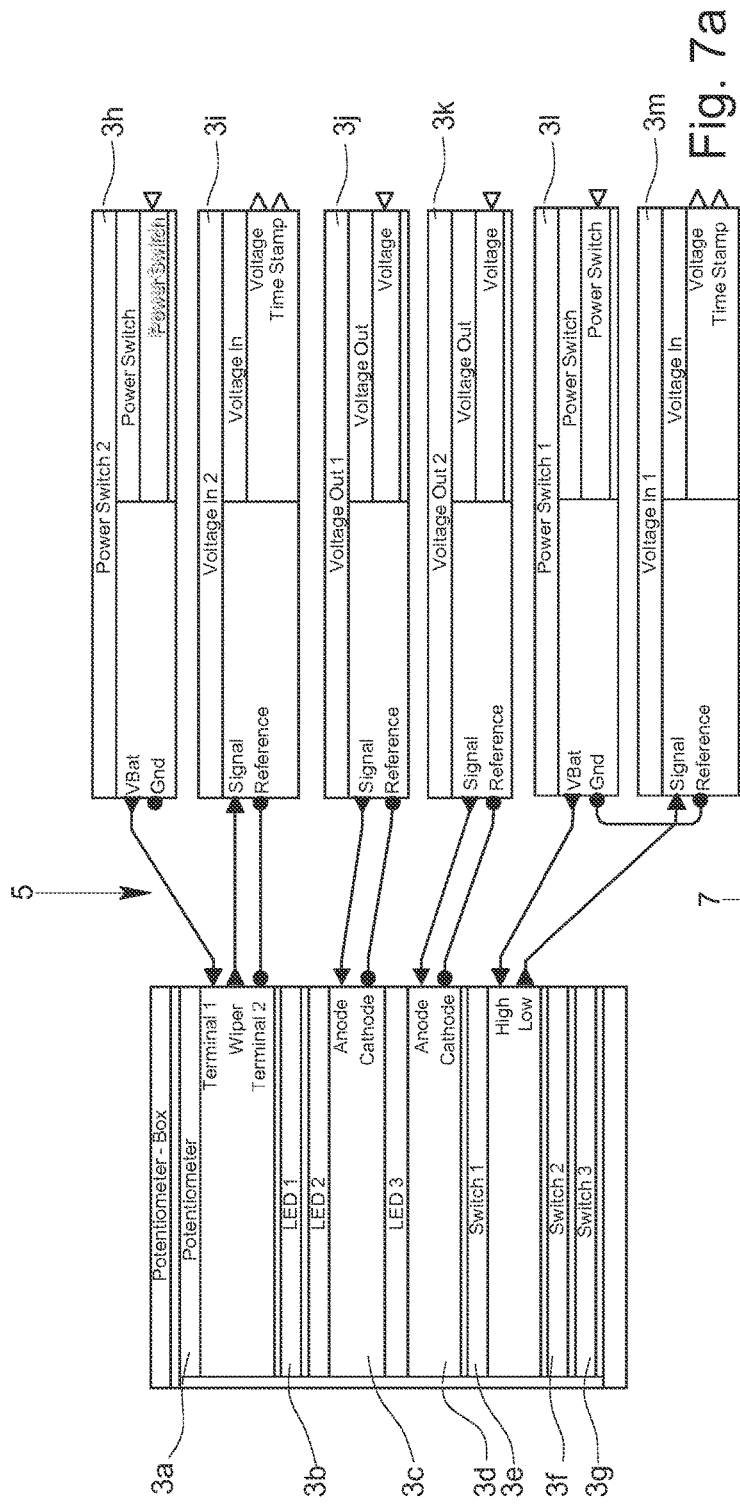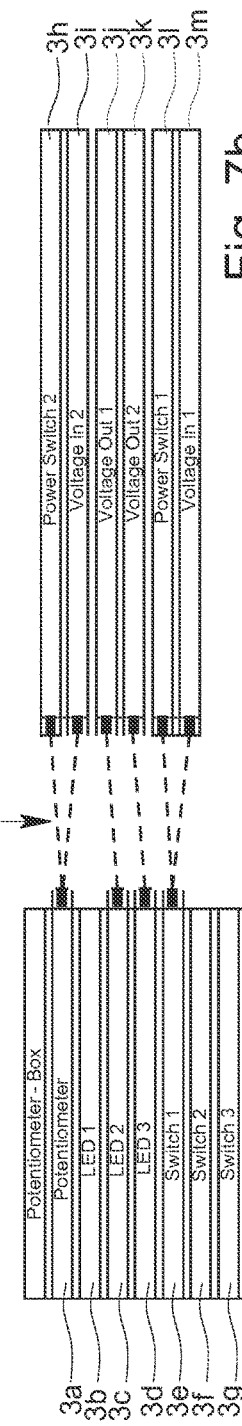
Fig. 7a
Fig. 7b

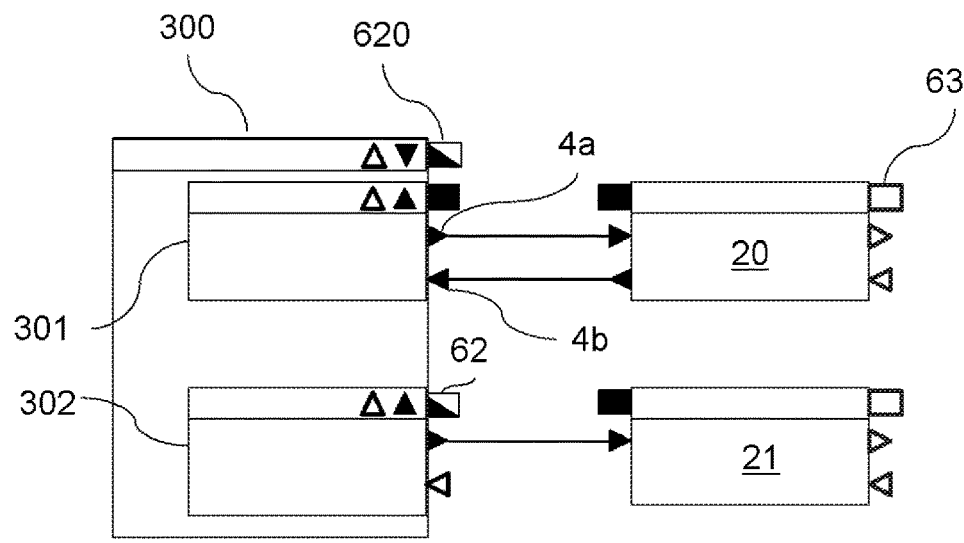
Fig. 11 a1
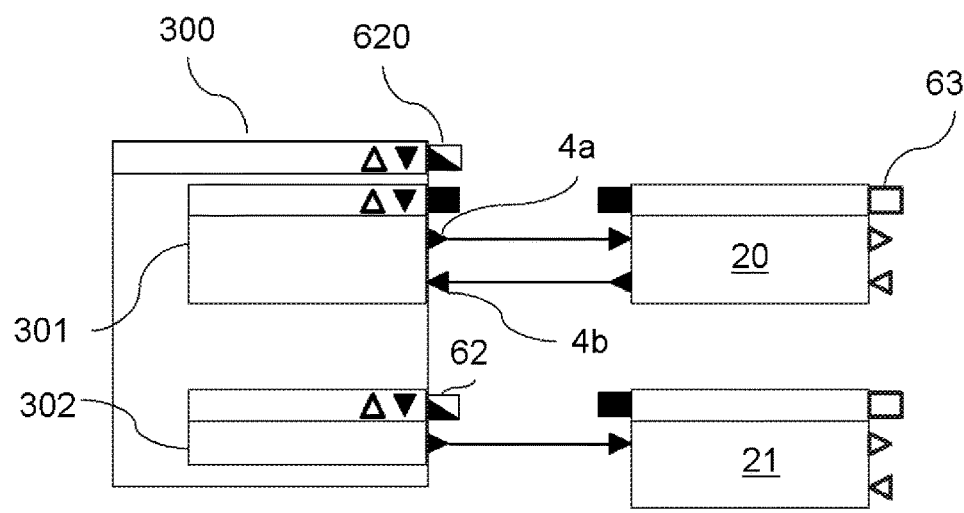
Fig. 11 a2

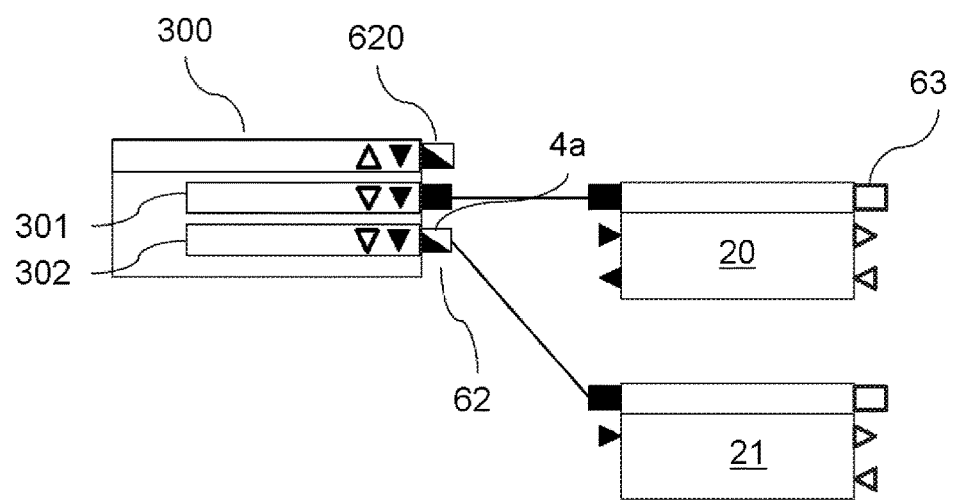
Fig. 11 a3

CONFIGURATION TOOL FOR CONFIGURING A MODEL OF A TECHNICAL SYSTEM

FIELD

The present invention relates to a configuration tool for configuring a model of a technical system on a computer having a display, said model including at least two model components, and each model component having at least one port, said model components being displayable in an expanded component representation on the display of the computer, said ports of the model components being connectable by port association lines, and, in an expanded line representation, said model components being displayable on the display of the computer along with their ports and the port association lines between the ports.

BACKGROUND

A model of a technical system is typically a block-based, graphical representation of a technical system that exists in reality and is frequently a control system including an electronic processing unit and I/O devices connected to said processing unit. Such technical systems can be very complex. For example, they may model the entire electronics of a motor vehicle and include thousands of model components, which are connected to each other via their inputs and outputs (ports) via respective connecting lines (port association lines) and, thus, are in operative connection with one another.

The model components may be of the same type. For example, they may include only model components of a mathematical model of the technical system, such as conventional block diagrams in control engineering, which are used to describe the physical/technical functionality of the technical system using mathematical means (transfer functions, look-up tables, etc.).

However, models of a technical system which are created and used in a configuration tool frequently include different types of model components. The reason for this is that these models are created of technical systems, or of parts of technical systems, in order to interact with other, real technical systems, or with parts of real technical systems. This scenario occurs, for example, in the development of electronic control units (ECUs) and in the development of open- and closed-loop control systems to be implemented in control units. Here, the control unit is frequently in the form of a piece of hardware that is to be tested and has suitable I/O interfaces. To enable reliable and easy testing of the control unit, the environment of the control unit—a physical process—is modeled with the aid of a mathematical model in a simulator capable of computing the physical process in real-time. The variables to be measured by the control unit, and those to be output in response thereto by the control unit, are measured and output, respectively, via suitably programmable I/O interfaces of the simulator. The aforedescribed method is also referred to as hardware-in-the-loop simulation. There are other applications for creating models of technical systems, which may be summarized under the term "rapid control prototyping". Going back to the aforementioned set-up, the control unit and the control system to be implemented in the control unit are here simulated and tested together with the real technical process. In both test scenarios, for which the model of a technical system, or of a part or a technical system, is to be created, the different portions of the test system; i.e., the control unit hardware, the I/O interfaces of the simulator, and the mathematical model of the technical process, are combined in the simulator.

A configuration tool, in which the model of the technical system includes different types of model components (i.e., model components of the mathematical model and/or model components of the I/O interfaces and/or model components of existing real hardware) is described, for example, in U.S. Patent Pub. No. 2008/0091279 A1. In this configuration tool, the model components can be displayed in an expanded component representation and in a reduced component representation. In the reduced component representation, the respective model component is only represented by a block that contains the name of the reduced model component and does not provide any information about the ports of the model component shown. In the reduced component representation, the ports of the respective model component are replaced by a reduced port, and the ends of the port association lines, which were connected to the ports of the model component that was previously shown expanded, but is now shown reduced, are connected to one single reduced port of the model component in reduced component representation. The manner in which the port association lines are displayed is governed solely by the selection of whether a model component is to be displayed in expanded or reduced component representation.

Due to the large number of model components in a model of a technical system, the selection of the reduced component representation for a model component provides an important way to reduce the immense complexity for a person working on the model, and to hide information that is less important for a particular work operation. However, when the representation of a model component is changed from expanded component representation to reduced component representation, a relatively large amount of data is hidden at once in one large step, so that it may be necessary to switch between the modes of representation of the model component relatively often during the development process.

SUMMARY

In an embodiment, the present invention provides a configuration tool including a tangible, non-transitory computer-readable medium having computer-executable instructions for configuring a model of a technical system and displaying the model on a display connected to a computer. The model includes at least two model components. Each model component has at least one port. Each model component is displayable in an expanded component representation on the display. Each of the at least one port of each of the model components is connectable to at least one other port of another of the model components by a respective port association line. Each model component is displayable in an expanded line representation on the display along with each of the at least one port and the port association line. The respective port association lines connected to ports of a selected model component are selectable so as to be displayed in a reduced line representation at least at the ends thereof connected to the selected model component and independently of the representation of the selected model component, whereby in the reduced line representation, the selected model component has a reduced port different from the ports of the model component, and the ends of the port association lines connected to the ports of the selected model component in the expanded line representation are represented as one or more component association lines connected to the reduced port in the reduced line representation.

At least one model component includes at least one model sub-component having ports and port association lines.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 7a, 7b show the exemplary model of FIG. 4 with model components in reduced component representation but expanded line representation (FIG. 7a), and in reduced component representation and completely reduced line representation (FIG. 7b);

FIG. 11a1 shows the exemplary model of FIG. 10a with the model component in reduced component representation and, at the same time, with the model sub-components in expanded line and component representation;

FIG. 11a2 shows the exemplary model of FIG. 10a with the model component in reduced component representation and, at the same time, with the model sub-components in expanded line representation and reduced component representation;

FIG. 11a3 shows the exemplary model of FIG. 10a with the model component in reduced component representation and, at the same time, with the model sub-components in reduced line and component representation;

DETAILED DESCRIPTION

Figure 1:
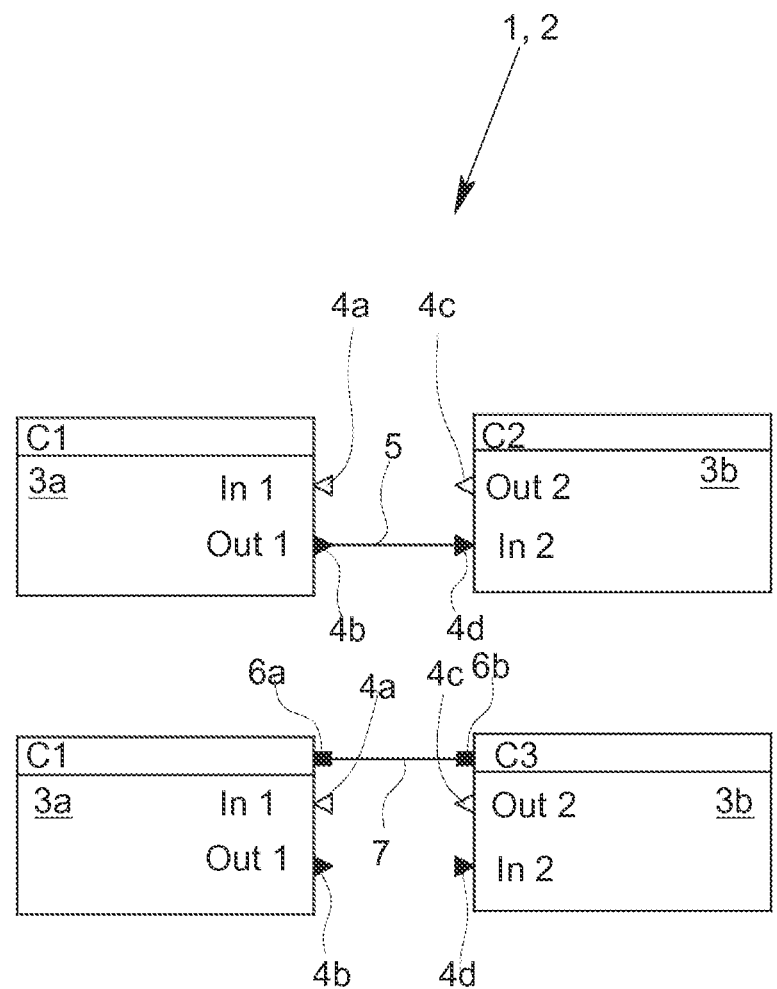
FIG. 1 shows a first exemplary model of a technical system with only one port association line, which was created using the configuration tool according to an embodiment of the present invention.

An embodiment of the present invention provides a configuration tool which allows the complexity of a model of a technical system to be incrementally reduced, thereby making it easier to work on such a model using the configuration tool.

In an embodiment, the configuration tool provides that at least for one selected model component, the port association lines connected to the ports of the selected model component can be selected to be displayed in a reduced line representation at least at the ends connected to the selected model component and independently of the representation of the selected model component itself, whereby in the reduced line representation, the selected model component has exactly one reduced port different from the ports of the model component, and the ends of the port association lines previously connected to the ports of the selected model component are connected as component association lines only to the reduced port. The feature of the present invention by which the mode of line representation is selectable for a model component (i.e., for the port association lines connected to the model component, independent of the representation of the model component itself) allows the complexity of the model representation to be defined in finer increments and in a manner convenient for a developer. This feature allows the user of the configuration tool to vary the level of complexity of the lines between the model components independently of the representation of the model components. For example, all port association lines between two model components can be replaced by one single component association line by specifying for each model component that the port association lines connected thereto are to be represented in reduced line representation only as component association lines at a single connection point, whereby a plurality of port association lines will automatically become a single component association line. At the same time, the expanded component representation can be maintained, allowing the developer to retain an overview of the contents of the model component, which was previously impossible.

Functionally, the ports of the model components are connection points for the port association lines. The ports may be represented at or in the model components in a graphically highlighted form, but need not be indicated by separate graphical elements. For example, the potential connection points may be identified by the user only by the fact that the names of the ports are positioned in the model components closely adjacent to the potential connecting points.

In a preferred embodiment, the configuration tool according to the present invention has the feature that the component association lines are displayed differently from the port association lines, particularly in a different color and/or in a different line style. This offers the user of the configuration tool the advantage of being able to tell from the line alone whether it is a port association line, which begins or ends at a particular port of a model component. This is of particular advantage when the model components connected by the respective line are far apart from each other, so that the connected model components cannot be displayed simultaneously by the display of the configuration tool. The different representation of port association lines and component association lines makes it much easier to identify and trace port and component association lines.

In one advantageous embodiment of the configuration tool according to the present invention, the model components may also at least in part be displayed in a reduced component representation as an alternative to the expanded component representation with simultaneous display of the ports. When the reduced component representation is selected for a model component, while at the same time the expanded line representation is selected for the connected ports of the model component, any unconnected ports that may be present are not displayed; i.e., they are reduced. In contrast, when at the same time the reduced line representation is selected for the connected ports of the model component, then no port is displayed anymore and, consequently, all ports are reduced. The configuration tool so designed allows the complexity of the model to be varied in even finer increments, namely in that when the reduced component representation and the expanded line representation are active at the same time, only those ports which are unconnected are excluded from display, while the ports that are involved in the signal exchange within the model will in any case continue to be displayed. The degree to which a model component can be reduced in the reduced component representation is governed by the selection of the line representation (expanded or reduced). Thus, the mode of line representation has a higher priority than the type of component representation.

Another advantageous embodiment of the configuration tool according to the present invention considers a hierarchical substructure of the model components, where each model component may have one or more model sub-components, which may in turn be divided into further model sub-components. In accordance with the present invention, for each model component and each model sub-component, the port-connecting lines can be selected to be displayed both in reduced and in expanded form. In reduced line representation, only component association lines are connected to the reduced port of a respective model component or model sub-component. In addition, an expanded or a reduced component representation can be selected for each model sub-component. In this connection, the degree to which a model sub-component can be displayed in the reduced component representation is governed by the selection of the line representation (expanded or reduced).

In another preferred embodiment of the configuration tool of the present invention, the selection options for the line representation and component representation are temporally coupled, so that a reduction of the line representation always precedes a reduction of the component representation, both for the model component and for any existing model sub-components. It is only after the reduced line representation is selected for a model component or a model sub-component that a reduced component representation can be selected for this model component or model sub-component.

In an advantageous refinement of the preceding embodiment of the configuration tool according to the present invention, one or more control elements are available to transfer a particular model component or its model sub-component into the respective available line and/or component representations. The control element may assume a plurality of forms, several examples of which will be illustrated below.

The inventive configuration tool for configuring a model of a technical system can be embodied and refined in many ways.

Figure 2:
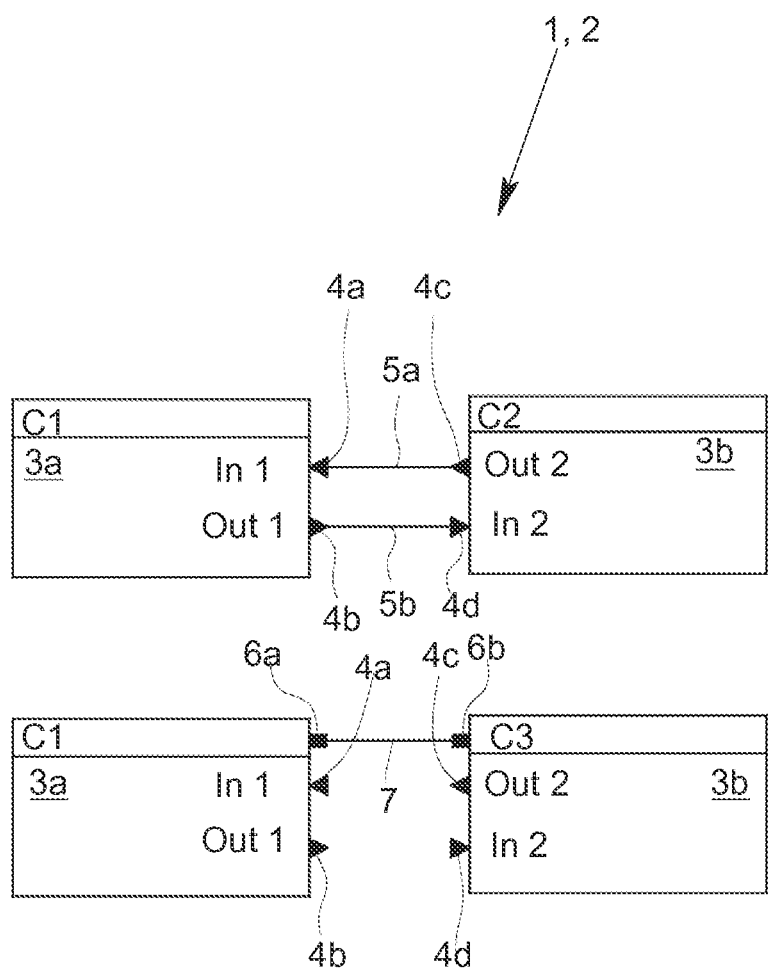
FIG. 2 shows another exemplary model, which is based on the model of a technical system illustrated in FIG. 1, but with two port association lines.
Figure 3:
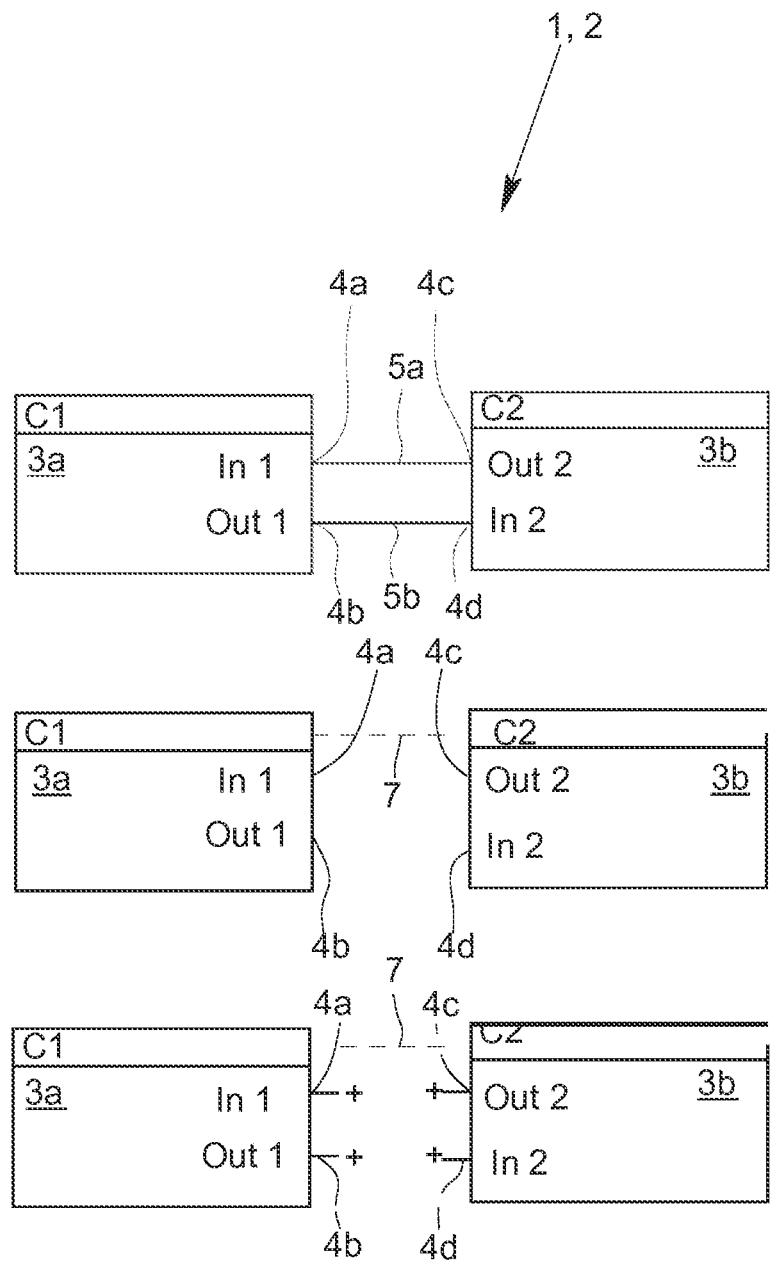
FIG. 3 shows further exemplary models of a technical system with functionally available ports and reduced ports which, however, are not graphically depicted as such.

In all of the Figures, configuration tools 1 for configuring a model 2 of a technical system are shown at least to the extent that model 2, which can be processed using the configuration tool, is at least partially shown in the same manner as it would be displayed on a display connected to a computer; i.e., on a monitor. As is apparent from all of the Figures, model 2 includes at least two model components 3*a*, 3*b*, and each model component 3*a*, 3*b* has at least one port 4. In FIGS. 1 through 3, the ports are separately denoted by reference numerals 4*a*, 4*b*, 4*c* and 4*d*. In FIGS. 1 through 3, model components 3*a*, 3*b* are each shown in an expanded component representation, so that ports 4 of the respective model components 3*a*, 3*b* are clearly visible. Functionally, a port 4 is a connection point for port association lines 5, by which ports 4 of model components 3*a*, 3*b* can be and, in the exemplary models shown are actually (at least partially), connected to each other.

The model components 3*a*, 3*b* that are shown topmost in FIGS. 1 through 3 are connected to each other and additionally exhibit an expanded line representation, in which model components 3*a*, 3*b* are depicted along with their ports 4 and port association lines 5, 5*a*, 5*b*. In the exemplary model of FIG. 1, a port association line 5 present between ports 4*b* and 4*d* illustrates the implementation of the signal flow between model components 3*a*, 3*b*. The two lower model components 3*a*, 3*b* in FIG. 1 are the same as those shown above, but here it is specified for the two model components 3*a*, 3*b* that port association line 5 connected to ports 4*b*, 4*d* of model components 3*a*, 3*b* is to be displayed in a reduced line representation at the two ends connected to the selected model components 3a, 3b. The term "reduced line representation" means that the selected model components 3a, 3b each have exactly one reduced port 6a, 6b different from ports 4a, 4b and 4c, 4d, respectively, and that the ends of port association line 5, which were previously connected to ports 4b, 4d of the selected model components 3a, 3b, are connected as a component association line 7 only to the respective reduced ports 6a, 6b. While FIG. 1 illustrates the principle of functioning of the reduced line representation, the advantages offered by the possibility of reduced line representation can be seen more readily from FIGS. 2 through 8.

In the exemplary model of FIG. 2, again, the model components 3a, 3b shown above are connected by two port association lines 5a, 5b, port association line 5a extending between ports 4a and 4c, and port association line 5b extending between ports 4b and 4d. When switching from expanded line representation shown in the lower part of the figure to reduced line representation shown in the upper part of the figure, the two port association lines 5a, 5b are replaced by a component association line 7 between reduced ports 6a, 6b. Here, unlike conventional configuration tools, model components 3a, 3b continue to be displayed in the expanded component representation. The option of selecting the additional property of reduced line representation makes it now possible to reduce the complexity of port association lines 5 between model components 3 without at the same time affecting the complexity of the representation of model components 3.

In FIGS. 1 and 2, ports 4 are graphically differently depicted to illustrate different options for implementation. In the view of FIG. 3, ports 4 are not indicated by separate graphical elements. Instead, the potential connection points are indicated to the user only by the fact that the names of the ports (In 1, Out 1; In 2, Out 2) are positioned in model components 3a, 3b closely adjacent to the potential connecting points. The uppermost representation of FIG. 3 again shows model components 3a, 3b both in the expanded component representation and in the expanded line representation. In the central representation of FIG. 3, the line representation is reduced while the component representation is expanded. Component association line 7 is displayed differently from port association lines 5a, 5b in the upper representation, namely as dashes instead of a solid line. The same is also true for the lower representation of model components 3a, 3b in FIG. 3. Here, however, extensions at ports 4a, 4b, 4c, 4d indicate to the user that port association lines are connected to these ports 4a, 4b, 4c, 4d in the expanded line representation.

Overall, it is useful in this connection if in the reduced line representation, the ports 4 of model components 3 that are connected with at least one port association line 5 in the expanded line representation are displayed differently from those ports 4 of model components 3 which are not connected with any port association line in the expanded line representation. This can be seen, for example, from FIG. 1, where ports 4a, 4c, which in the (upper) expanded line representation, too, are not connected with a port association line, are displayed differently from ports 4b, 4d, which are connected with a port association line 5 in the expanded line representation. Thus, in the reduced line representation, it is always possible to see which ports 4 are connected to other ports in the expanded line representation.

Figure 9:
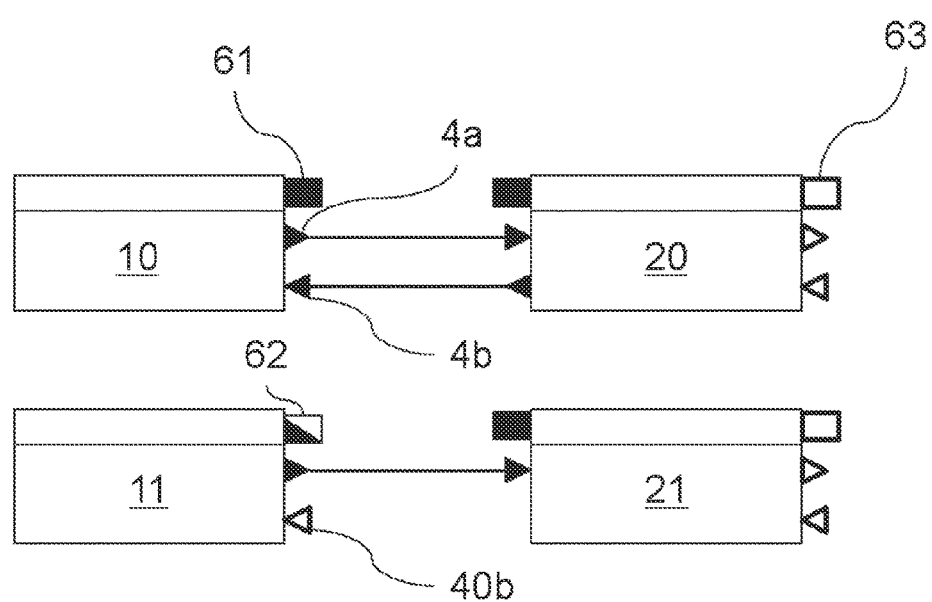
FIG. 9 shows another exemplary model, in which the reduced ports are displayed differently depending on the connection status of the ports of the associated model component.

FIG. 9 shows a possible representation where reduced ports 61, 62 and 63 are represented by three differently designed graphical elements such that information on whether some, all or none of the ports of a model component and possible model sub-components thereof are connected can be obtained, at least partially, also in a reduced component representation. Thus, a combined overview of the current connection status of all ports of a model component is given in abstract form even when the ports are no longer displayed. In this connection, a distinction is made between "no port connected", "some ports connected", and "all ports connected." In the exemplary model shown in FIG. 9, graphical element 63 for the reduced port is white when all ports of the model component are unconnected. When only some of the ports are connected, as in the case of model component 11, then the graphical element 62 is patterned. When all of the ports are connected, as in the case of model component 10, then graphical element 61 is black.

Figure 4:
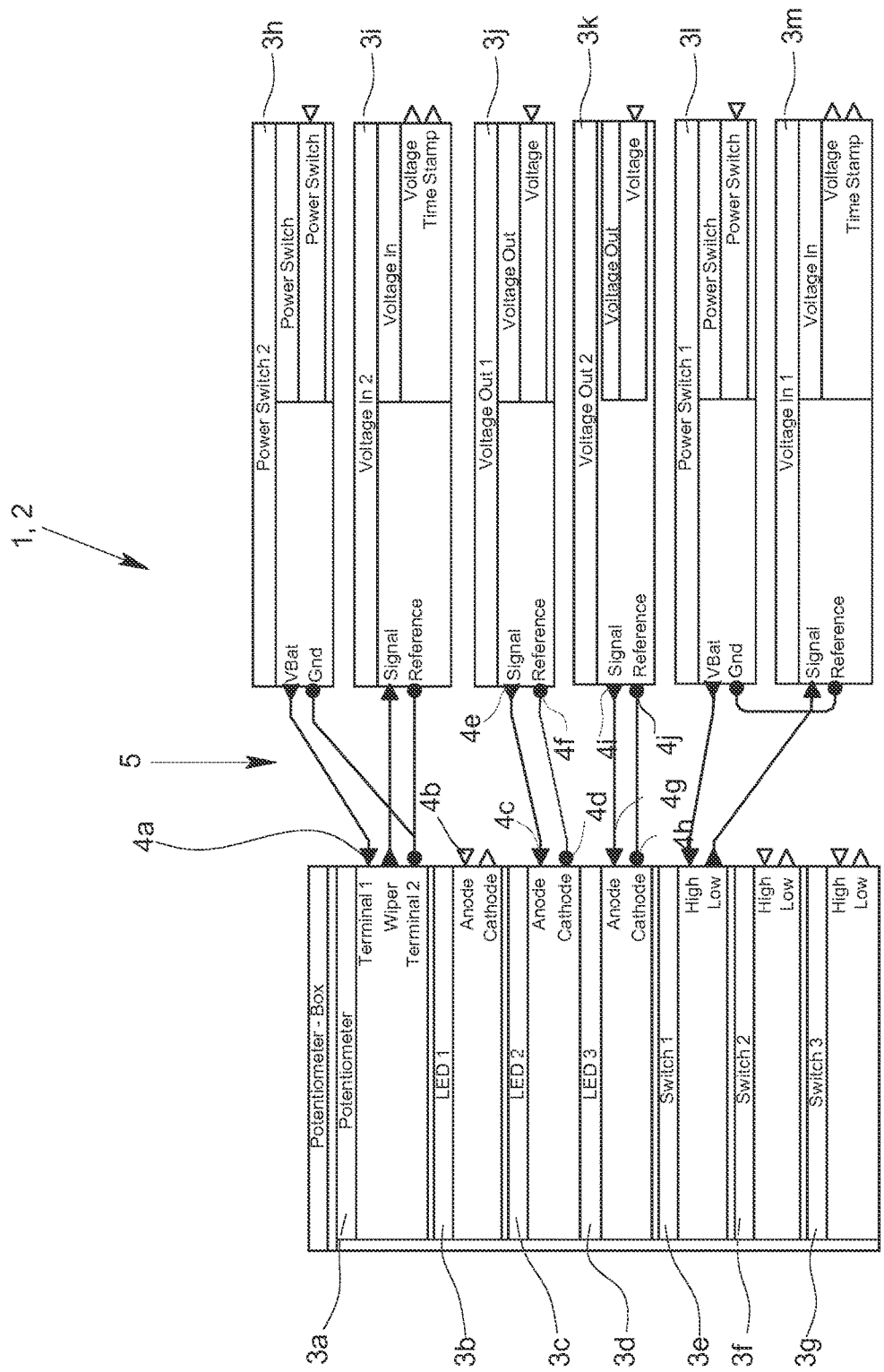
FIG. 4 shows another exemplary model created using the configuration tool according to an embodiment of the present invention, with model components in expanded component representation and expanded line representation.

In FIGS. 4 through 8, the operating principle of the configuration tool 1 according to the present invention is illustrated by way of a practical example. The exemplary model of FIG. 4 constitutes the basis for the representations in FIGS. 5 through 8. In the left portion of model 2 shown in FIG. 4, seven model components 3a, . . . , 3g are grouped in a higher-level model component named "potentiometer box", which includes a hierarchical scaling of model components. In the right portion of model 2, there are six further model components 3h, . . . , 3m. In FIG. 4, both an expanded component representation and an expanded line representation were selected for the representation, so that ports 4 can be seen on all model components 3. In the expanded component representation, too, ports 4 which are connected with port association lines 5 (i.e., all ports 4 provided with reference numerals, except for port 4b) are displayed such that they can be distinguished from those ports which are not connected with port association lines 5 (for example, port 4b).

Figure 5:
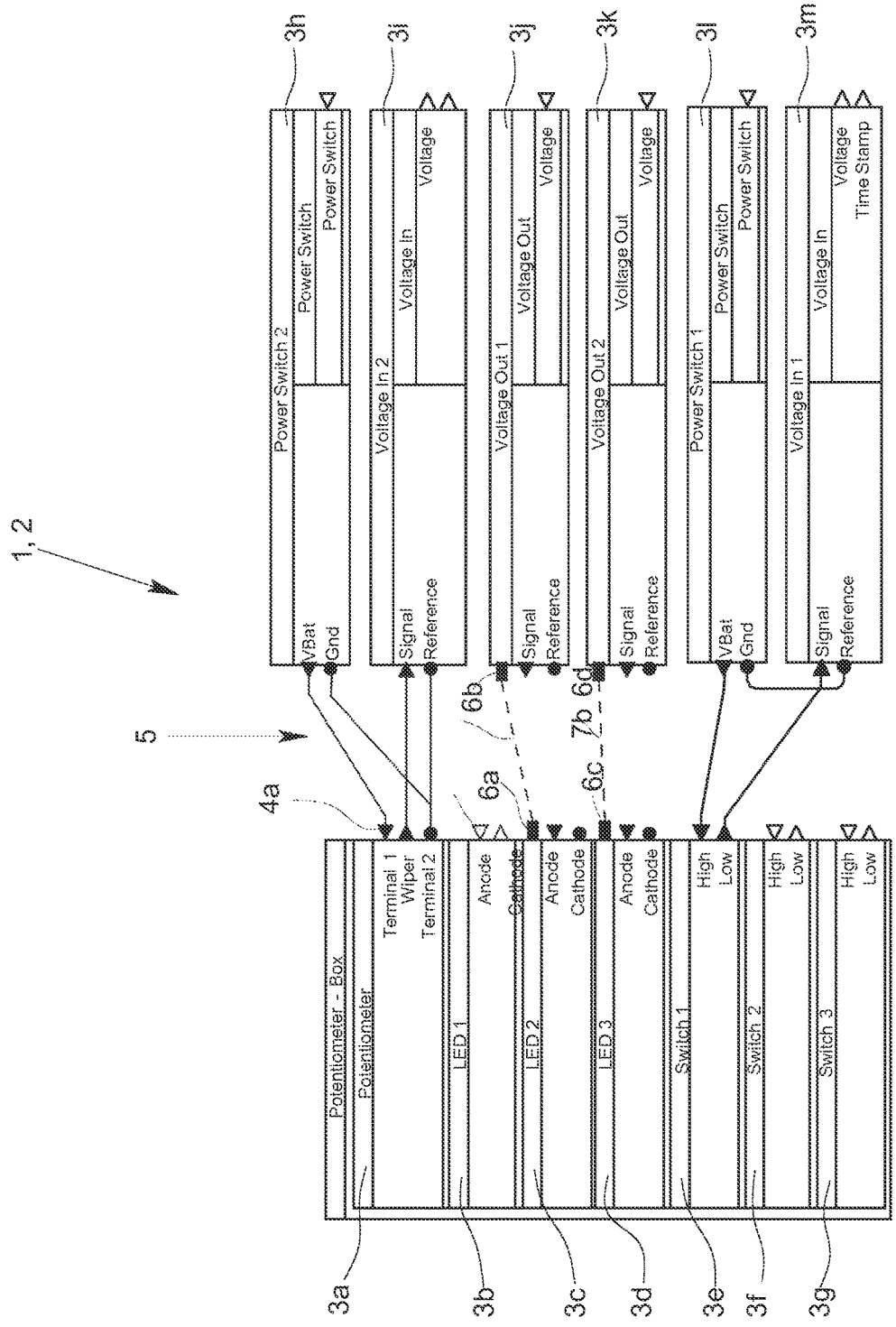
FIG. 5 shows the exemplary model of FIG. 4 with model components in expanded component representation and partly in reduced line representation.

The exemplary model of FIG. 5 is based on that of FIG. 4. However, it has been specified for model components 3c, 3d, 3j and 3k that the port association lines 5 connected to their ports 4c, . . . , 4j are to be displayed in a reduced line representation, which is why port association lines 5 between ports 4c and 4e, ports 4d and 4f, ports 4g and 4i as well as between ports 4h and 4j are omitted and replaced by component lines 7a, 7b between reduced ports 6a and 6b and between reduced ports 6c and 6d, respectively. As can readily be appreciated, the detailed information as to which ports 4 are connected to which other ports 4 is thereby omitted, while keeping the information about the model components 3 of model 2 between which there is, in principle, an operative connection via port association lines, at least in the expanded line representation. In any case, it can be seen in FIG. 5 that only a part of all the model components 3 of model 2 are displayed with reduced line representation. This part of model components 3 can be selected by the user of configuration tool 1.

Figure 6:
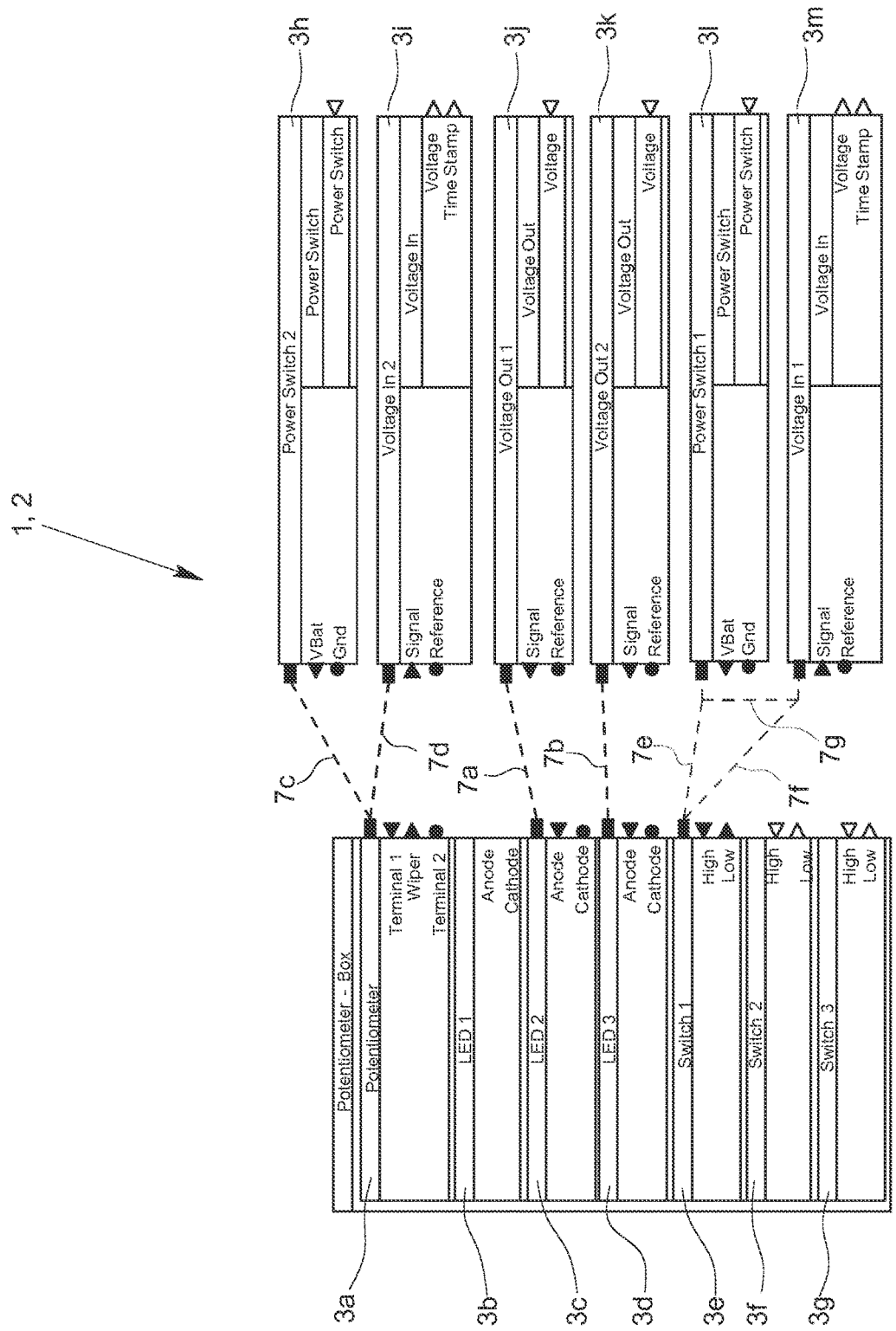
FIG. 6 shows the exemplary model of FIG. 4 with model components in expanded component representation and completely reduced line representation.

The exemplary model of FIG. 6 is also based on that of FIG. 4, but in contrast to the exemplary model of FIG. 5, the reduced line representation has been specified for all port association lines 5; i.e., for all ports 4 of all model components 3. This has the effect that, in addition to component association lines 7a, 7b, which are shown in FIG. 5, now further component association lines 7c, 7d, 7e and 7f as well as 7g are produced. In the exemplary model of FIG. 7, it is shown for the first time that model components 3 may also be displayed in a reduced component representation as an alternative to the expanded component representation with simultaneous display of ports 4 of model components 3. In FIG. 7a, this applies to model components 3b, 3f and 3g. In the reduced component representation of model components 3, ports 4 are no longer visible. What is special about the exemplary model of FIG. 7a is that when reduced component representation is selected at the same time as the expanded line representation for the connected ports 4 of model components 3, only unconnected ports are not shown; i.e., reduced. Since, as shown in FIG. 4, ports 4 of model components 3b, 3f and 3g are unconnected, it is only these model components 3b, 3f, 3g that are minimized in the reduced component representation. By also selecting the expanded line representation, the other model components 3a, 3c, 3d, 3e and 3h through 3m are prevented from being reduced.

In FIG. 7b, unlike in FIG. 7a, a reduced line representation has been selected for all connected ports 4 of model components 3, so that model components 3a through 3m are no longer prevented from switching to the reduced component representation. In other words, the selection of the line representation takes precedence over the selection of the component representation.

All of the exemplary models described hereinbefore have in common that when the reduced line presentation is specified for a particular model component 3, all port association lines 5 of this particular model component 3 to other connected model components are replaced by component association lines 7; i.e., by association lines which begin or end at a reduced port 6.

Figure 8:
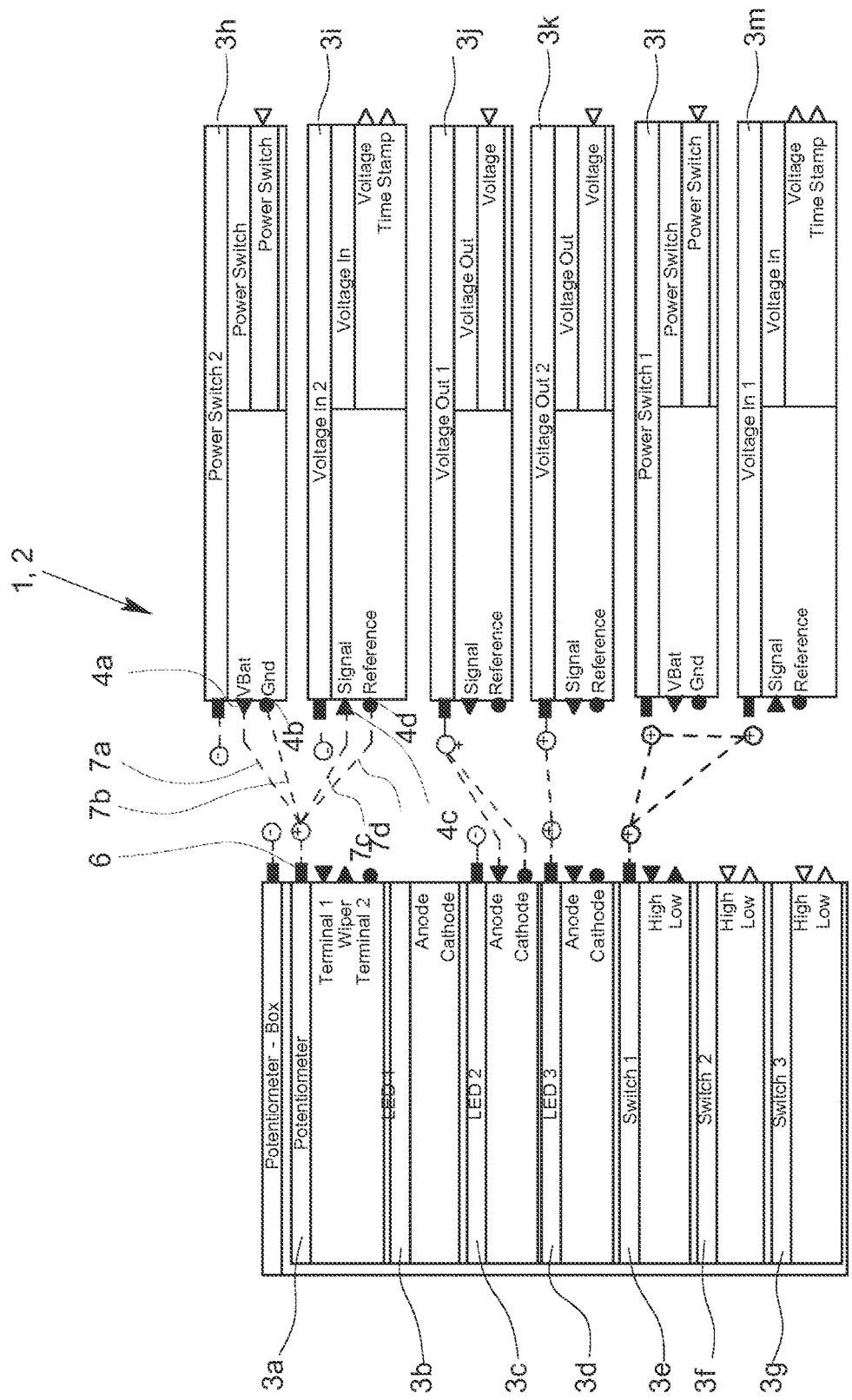
FIG. 8 shows the exemplary model of FIG. 4 with different combinations of component and line representations.

The exemplary model of FIG. 8 shows the result of a representation of model 2, in which all model components 3a, . . . , 3m are displayed in the expanded component representation and where the reduced line representation was selected only for model components 3a, 3d, 3e and 3j through 3m. The expanded line representation continues to be active for model components 3c, 3h and 3i. In this exemplary model it can be seen what happens when different line representations are selected for model components 3a, 3h, 3i and 3c, 3j. In the case of model components 3a, 3h and 3i, this results in that the port association lines 5 shown in the expanded representation (FIGS. 4, 5 and 7a) end at a reduced port 6 in model component 3a, and in that component association lines 7a through 7d end at unreduced ports 4a, 4b, 4c and 4d in the model components 3h, 3i for which reduced line representation was not selected.

In FIG. 8, in addition to reduced port 6 of model component 3a, all other model components which are not identified by a separate reference numeral also have reduced ports. All reduced ports are provided with an appendix which ends with a plus sign (+) in a circle or with a minus sign (−) in a circle. The two circular symbols indicate the mode of line representation (reduced or expanded) that was selected for the model component; i.e. for the ports of the respective model component. The plus sign in the circle is indicative of a reduced line representation, which may be expanded by clicking on the plus sign. Analogously, the minus sign in the circle is indicative of an expanded line representation, which may be reduced by clicking on the minus sign. Clicking on the plus or minus sign does not only change the mode of line representation, but also changes the sign displayed in the respective circle accordingly; i.e., from plus to minus and vice versa. This provides an intuitive mechanism for displaying the selected mode of line representation as well as an intuitive mechanism for changing the mode of line representation.

Figure 10A:
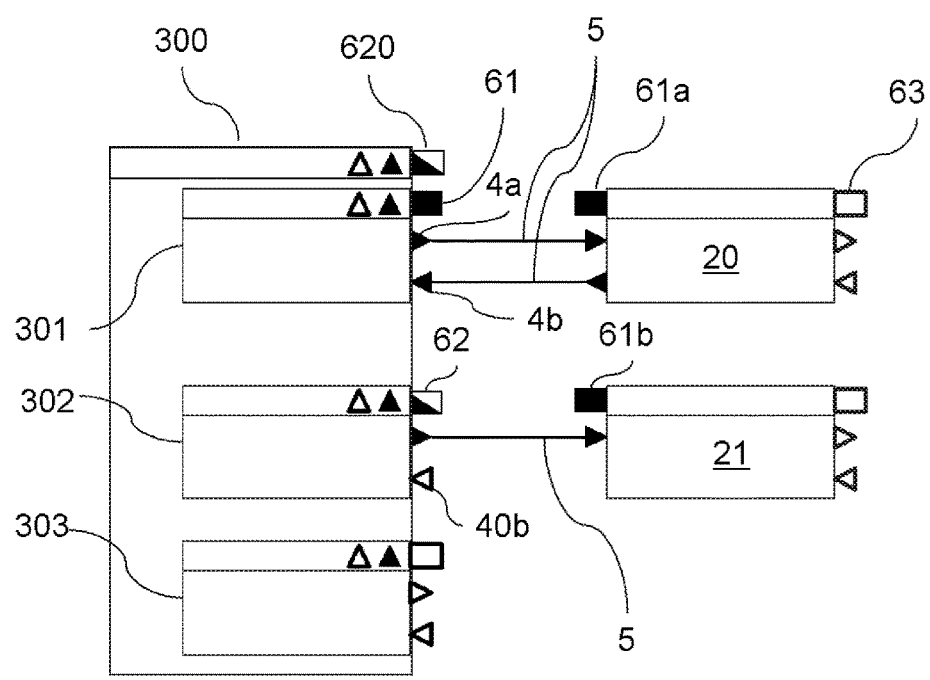
FIG. 10a shows a further exemplary model of a technical system, which was created using the configuration tool according to an embodiment of the present invention, which has a model component having three model sub-components in completely expanded component and line representation.

FIGS. 10a through 10e show further exemplary models of a technical system, which were created using the configuration tool of the present invention. Here, model component 300 has three model sub-components 301, 302 and 303. In FIG. 10a, the model is shown in completely expanded line and component representation for both the model components and the model sub-components. All ports of model sub-component 301 are connected via port-connecting lines to model component 20. Model sub-component 302, in contrast, has one connected port and one unconnected port, whereas the ports of model sub-component 303 are all unconnected.

Analogously to the options of displaying the model components in expanded, partially reduced and completely reduced line representation, as described in FIGS. 4-6, the model sub-components 301, 302, and 303 can also be displayed in expanded, partially reduced and completely reduced line representation.

Figure 10B:
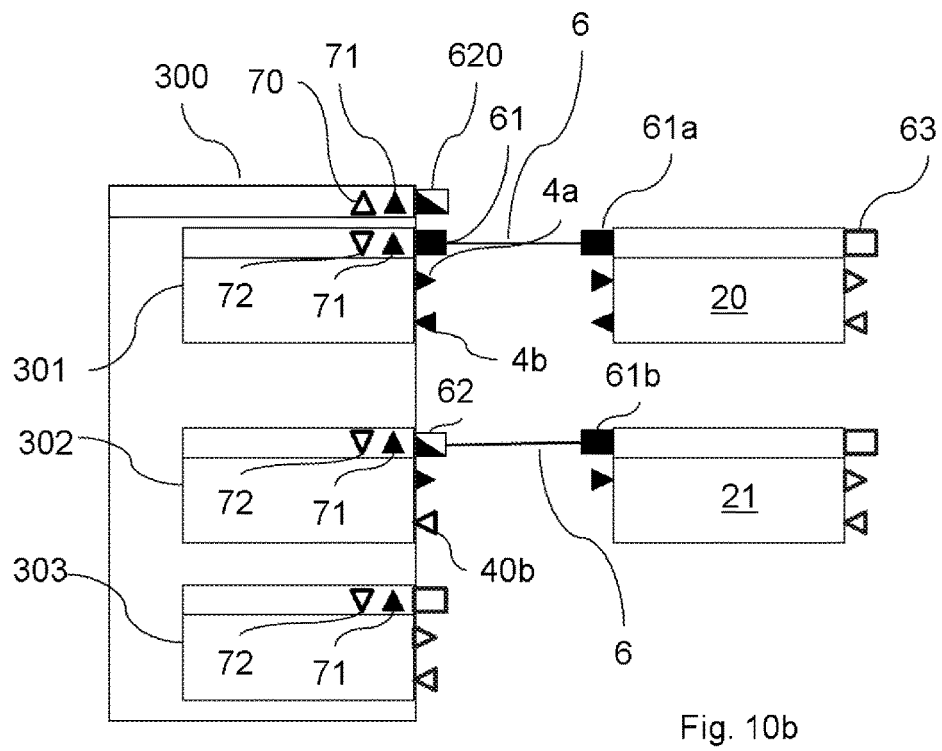
FIG. 10b shows the exemplary model of FIG. 10a with the model sub-components in reduced line representation.

FIG. 10b shows the model with expanded line and component representation for the model component and, at the same time, with reduced line representation and expanded component representation for model sub-components 301, 302, and 303. Here, the port association lines 5 shown in FIG. 10a for the model sub-components are replaced by component association lines 6 between reduced ports 61 and 61a and between reduced ports 62 and 61b, while all ports of the model sub-components continue to be displayed.

Figure 10C:
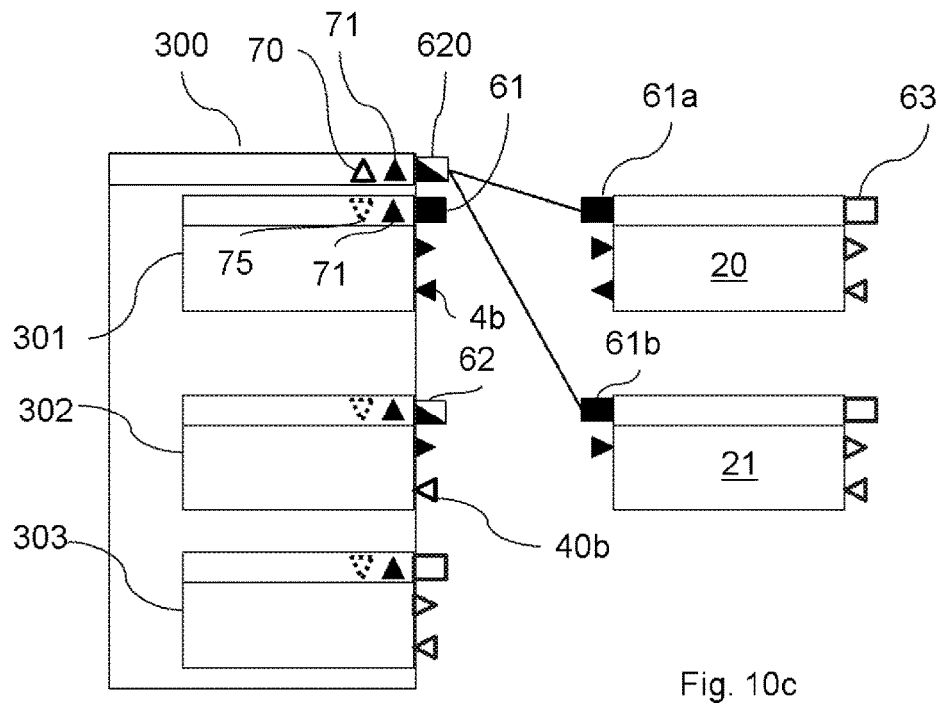
FIG. 10c shows the exemplary model of FIG. 10a with the model component in reduced line representation.

FIG. 10c shows the model with expanded component representation for the model component 300 and model sub-components 301, 302, and 303 and, at the same time, with reduced line representation for the model components 300, 20, and 21. The reduced ports 61a and 61b of model components 20 and 21, which, in FIG. 10b, are connected to the ends of component association lines 6, are instead connected to reduced port 620 of model component 300 in this representation.

For the models from FIGS. 10a through 10c, in addition to a reduced line representation for the model component and/or the model sub-component, it is also possible to select different component representations for the model components and/or the model sub-components.

Figure 10D:
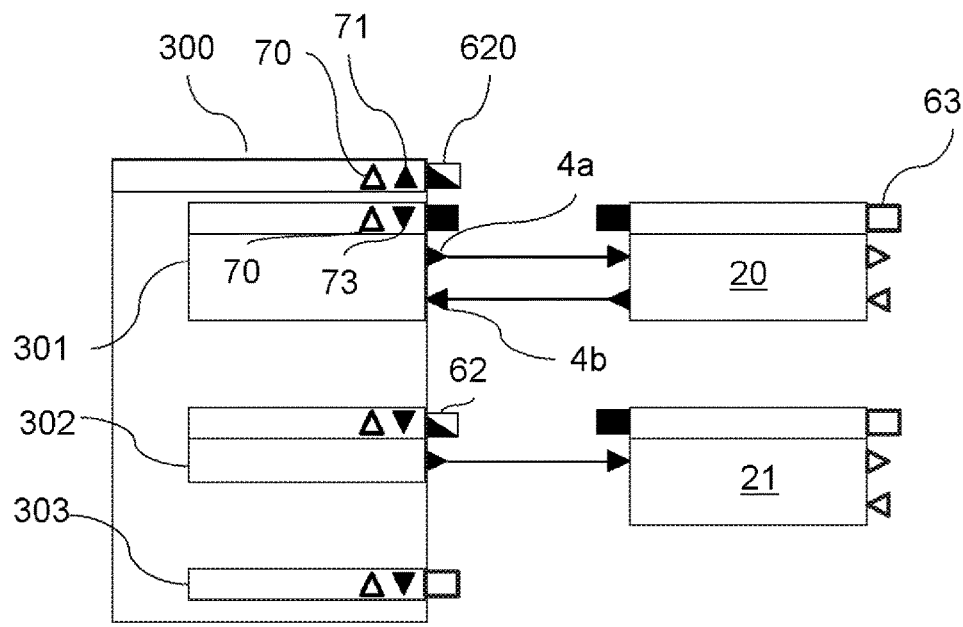
FIG. 10d shows the exemplary model of FIG. 10a with the model sub-components in reduced component representation.

Starting from the representation in FIG. 10a, a reduced component representation may be selected individually for all model sub-components 301, 302, and 303 analogously to the exemplary model of FIG. 7 for the model component. FIG. 10d shows the model from FIG. 10a with expanded line representation for model component 300 and for model sub-components 301, 302 and 303. At the same time, a reduced component representation has been selected for model sub-components 301, 302 and 303. In the reduced component representation for model sub-components 301, 302 and 303, only the unconnected ports of model sub-components 302 and 303 are not displayed.

Figure 10E:
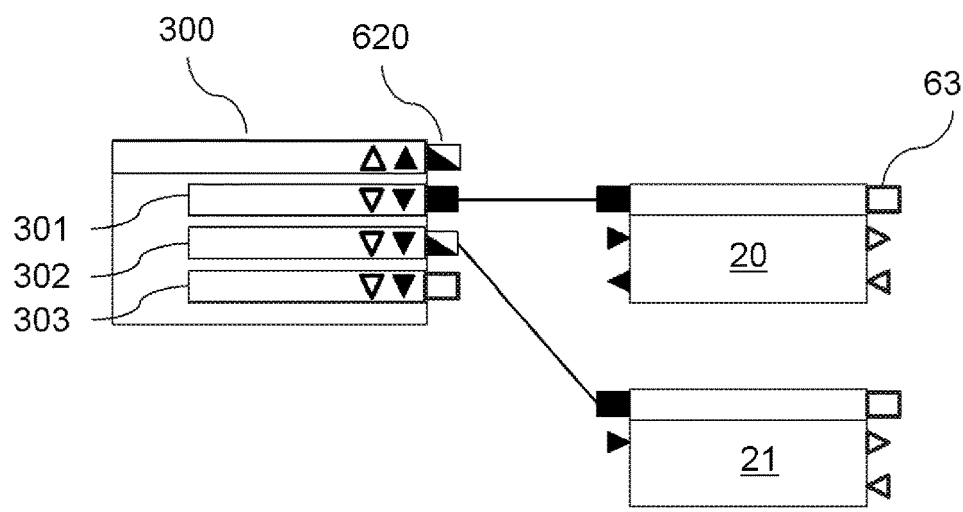
FIG. 10e shows the exemplary model of FIG. 10a with the model sub-components in reduced line and component representation.

FIG. 10e shows the model with reduced line and component representation for the model sub-components 301, 302, 303 and, at the same time, with expanded line and component representation for the model component 300.

Figure 10F:
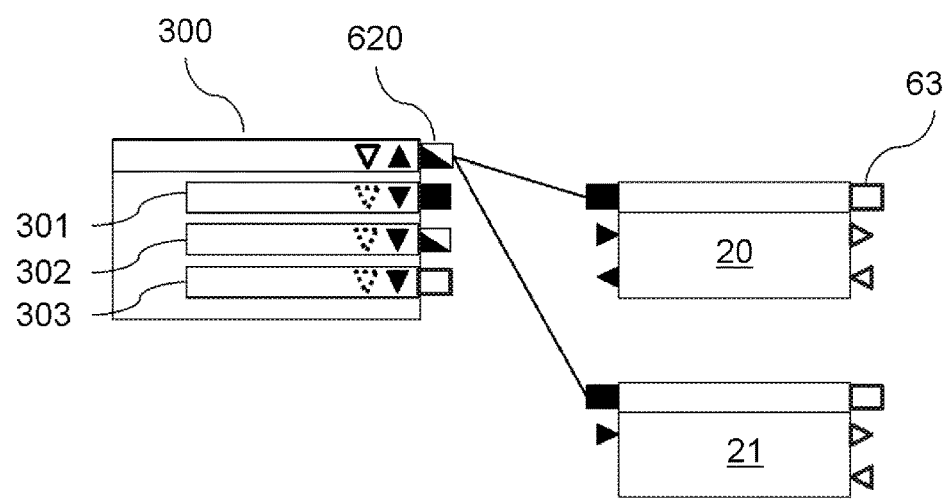
FIG. 10f shows the exemplary model of FIG. 10a with the model sub-components in reduced line and component representation and, at the same time, with the model component in reduced line representation.

In FIG. 10f, the model is shown with reduced line and component representation for the model sub-components 301, 302, 303 and, at the same time, with expanded component representation and reduced line representation for the model component 300, so that only the reduced model component port 620 is connected to the ends of the component association lines.

In addition to displaying the model sub-components in reduced component representation, the model from FIGS. 10a through 10f also allows the model component to be displayed in reduced component representation. Depending on the line and component representation selected for the model sub-components, the representation options are as follows:

FIG. 11a1 shows the model of FIGS. 10a-f with reduced component representation and expanded line representation for model component 300 and, at the same time, with expanded component and line representation for model sub-components 301 and 302. In this representation, the unconnected model sub-components of model component 300 (in this case model sub-component 303) are not displayed when model component 300 is displayed in reduced component representation.

FIG. 11a2 also shows the model with reduced component representation and expanded line representation for model component 300 and, at the same time, with expanded line representation and reduced component representation for model sub-components 301 and 302. Accordingly, only connected ports of the connected model sub-components 301 and 302 are displayed.

FIG. 11a3 shows a further, modified representation of the model of FIG. 11a1, in which the model component 300 is again displayed in reduced component representation and expanded line representation, but in which a reduced component and line representation has been selected for the model sub-components 301 and 302.

Figure 11B:
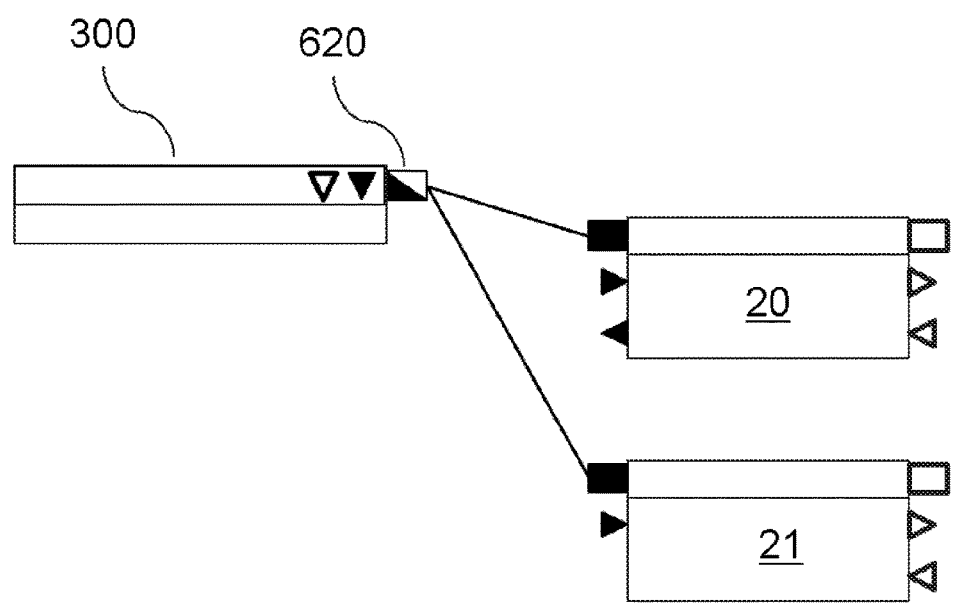
FIG. 11b shows the exemplary model of FIG. 10a with the model component and the model sub-components in completely reduced line and component representation.

FIG. 11b finally shows the model with reduced component and line representation for both the model component 300 and the model sub-components 301 and 302.

As an alternative to the plus or minus sign in a circle, as depicted in the model of FIG. 8, which is used as a control element for converting the reduced or expanded line representation into the respective other line representation, the models of FIGS. 10a-10f and 11a-11b illustrates another possible representation of the control element. In this connection, the use of the control elements is not limited to the respective models, but may be implemented both in the form of the one variant and in the form of alternative possible representations. Thus, for example, instead of assigning a separate control element to each reduced port, as illustrated in FIG. 8, alternatively, a single (graphical) control element may be assigned to a particular model component or its reduced port by positioning on the display of the computer. An additional, alternative assignment of the control element to a selected model component may be made by marking the respective model component or the respective reduced port.

Furthermore, as shown in FIGS. 10 and 11, the control element may be integrated into the representation of each model component or model sub-component. For the sake of clarity, the control elements were plotted only for the model component on the left side. In the exemplary models shown, such a representation may be selected for any model component.

Similarly to the plus and minus signs, the respective graphical representations of triangles 70, 71, 73 and 75 indicate which representation options are available for the component representation or the line representation.

In FIGS. 10a-10f and 11a-11b, a filled triangle (71, 73) is associated with the component representation, while a non-filled triangle (70, 72) is associated with the line representation.

In accordance with the model of FIGS. 10a-f:
a filled triangle standing on a point (73) symbolizes that the block of the model component can be unfolded (see FIG. 10d),
a filled triangle with one point pointing up (71) symbolizes that the block of the model component can be closed (see FIG. 10b),
a non-filled triangle with one point pointing up (70) symbolizes that the line representation can be reduced by replacing the port association lines by at least one component association line (see FIG. 10b),
a non-filled triangle with one point pointing down (72) symbolizes that the port association lines can be displayed; i.e., that an expanded line representation can be selected (see FIG. 10b).

In FIG. 10c, a further option is shown for cases where a change from the reduced to the expanded line representation does not make any difference in the representation. In this example, the non-filled triangles of the model sub-components are only indicated in broken lines (75) because in this case, the lines are combined on the higher level of hierarchy, i.e., the model component level, and therefore, an "unfolding" on the model sub-component level is not possible or does not produce any change in the representation.

The options for "unfolding" and "closing" the components and connecting lines are symbolized by the triangles in a particularly illustrative manner. However, any desired graphical element may be used to represent the control element, and the representation is not limited to triangles.

Figure 12:
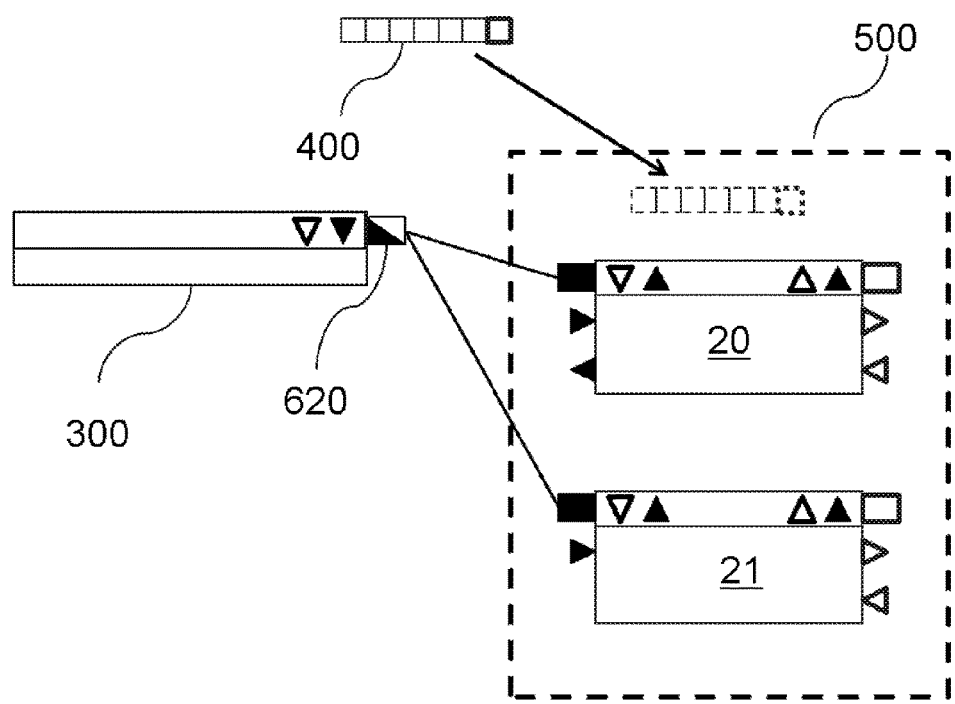
FIG. 12 shows an assignable control element for changing the line and component representation.

Furthermore, it is possible to introduce, for each of the model components, for a group of model components, or even for all model components together, a slider which sets the representation of the components and lines uniformly to reduced or expanded representation for all model components. FIG. 12 shows a control element 400 which, by way of example, takes the form of a slider. However, it would also be possible to use any other form of control element. Control element 400 may be assigned to a model component by positioning it on the display device. As indicated, control element 400 may be assigned to the block of model component 500. Alternatively, the position of the control element on the display could also be stationary, and assignment to one or more particular model components or the reduced ports thereof could be accomplished by marking the respective model components or ports. For example, it is possible to select model component block 500 to apply the functionality of control element 400 to the components of block 500.

Figure 12A:
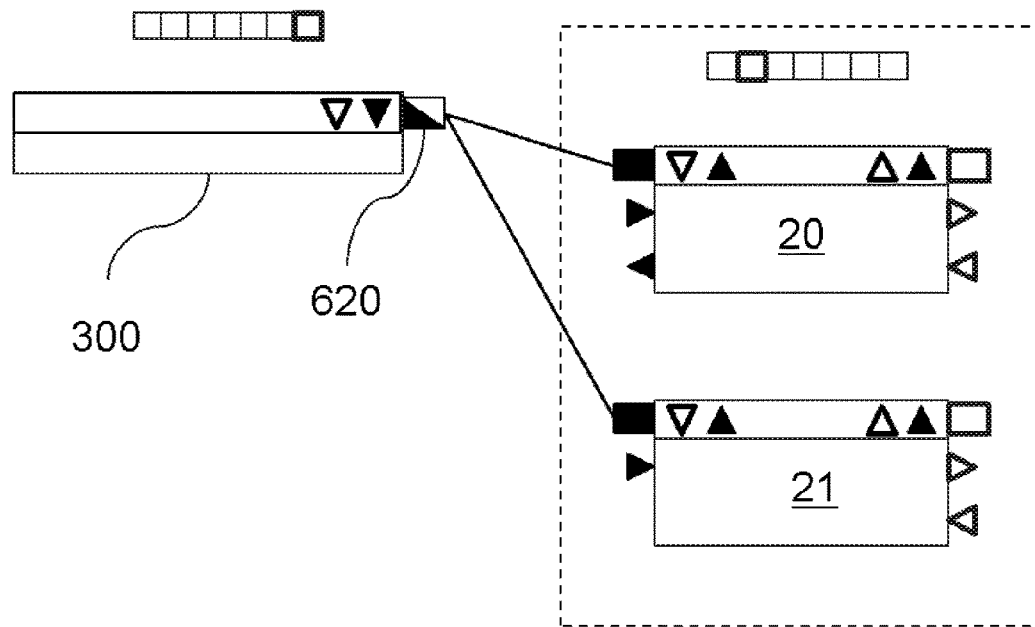
FIG. 12a shows a slider control for changing the line and component representation of a model component or a model component block.

FIG. 12a illustrates the principle of such a slider, which is set for one model component on the left side and for both model components on the right side. In this example, completely reduced line and component representation was selected for the left model component by shifting the highlighted slider box to the right edge. The farther the highlighted slider box is moved to the left, the more expanded is the representation of the model component and, possibly, its model sub-components. On the right side, the selection of the position of the slider box would set the representation of both model components in the same way. This way of selecting the representation is particularly advantageous for a quick initial representation since it is not necessary to select a particular representation separately for each of the components. When combined with the above-described control elements in the form of graphical elements for each model component and model sub-component, as shown in FIG. 12a, the slider can thus be used to provide a coarse setting for all model components and model sub-components, which may then be individually modified using the control elements (triangles) that are integrated into the model component.

Figure 12B:
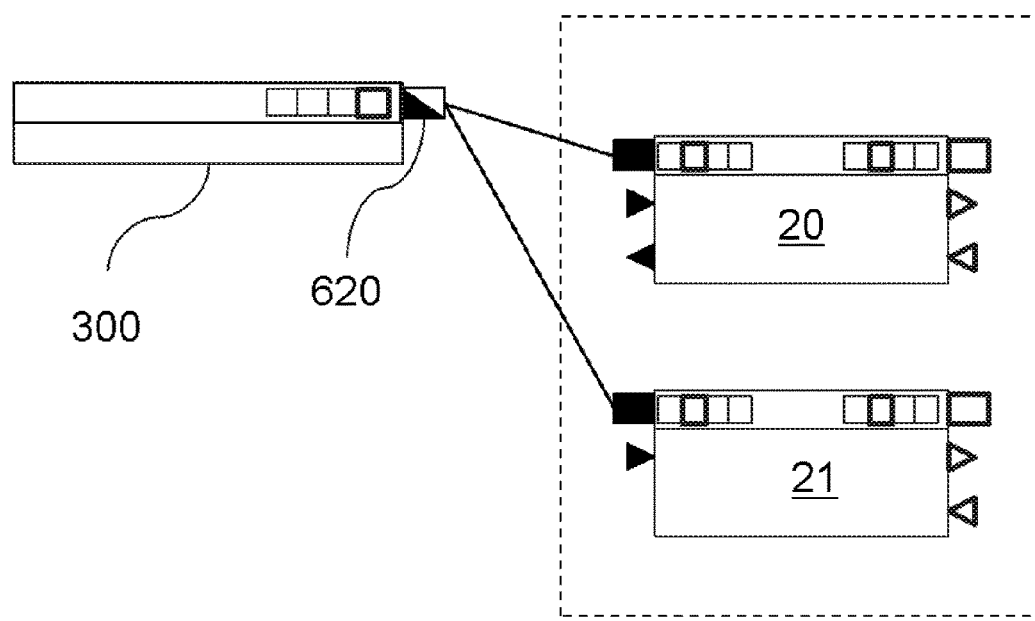
FIG. 12b shows slider controls for changing the line and component representation of a model component which are integrated into the representation of each model component.

Alternatively, such a slider may also be defined for each model component, as illustrated in FIG. 12b. This allows the line and component representations to be set individually for each side of the model component and possibly existing model sub-components.

In accordance with another preferred embodiment, the representation options for the model components and their model sub-components are temporally coupled. In this connection, the closing of the line representation always precedes closing of the respective model component or model sub-component.

Figure 13A:
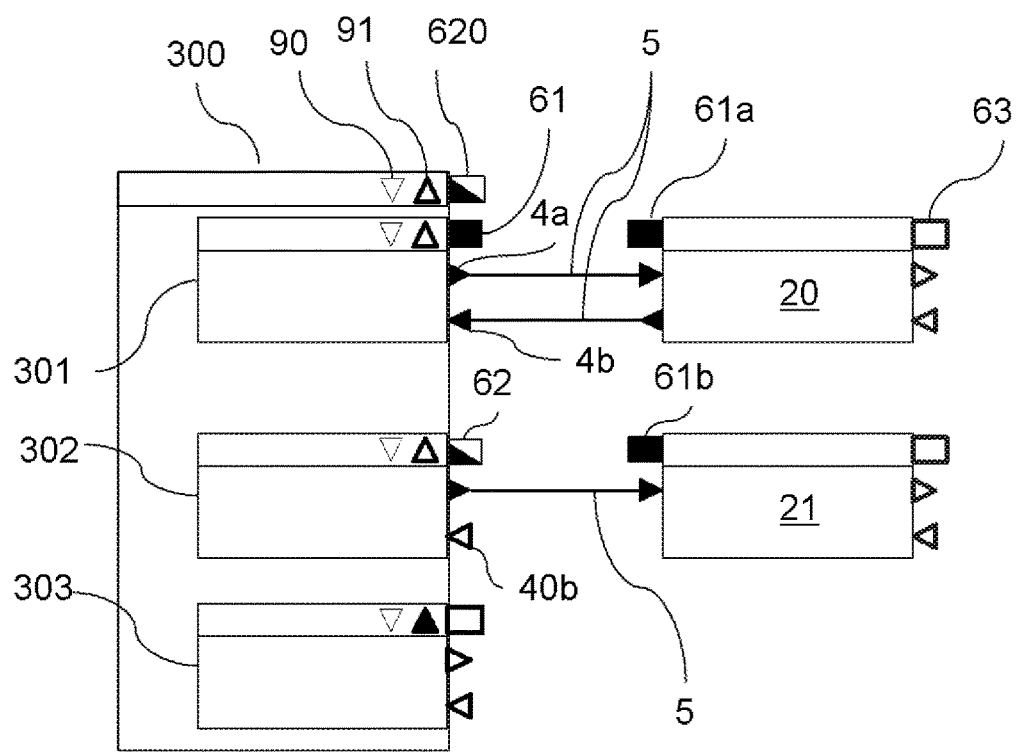
FIG. 13a shows a further exemplary model of a technical system, which was created using the configuration tool according to an embodiment of the present invention, which has a model component having three model sub-components in completely expanded line and component representation, and in which conversion options for the line and component representation are temporally coupled.

FIG. 13a shows the same initial situation as in the model of FIG. 10a for a model of a technical system, which was created using the configuration tool of the present invention. Model component 300 has three model sub-components 301, 302 and 303. In this representation, the control element for unfolding and closing the line and component representation is represented by the symbols 90 and 91. The representation was selected, by way of example, such that:

- a triangle with one point pointing up symbolizes 'closing' (closing symbol), whereas
- a triangle with one point pointing down symbolizes 'unfolding' (unfolding symbol);
- a change of the line representation is symbolized by a triangle with a bolded border, whereas
- a change of the component representation is represented by a filled triangle;
- when unfolding or closing is not possible, the respective triangle is represented with only a thin border.

The options that are available for unfolding and closing the line and component representation depend on the currently selected line and component representation. Since, in accordance with the present invention, closing of the component representation is not possible until port-connecting lines 5 are closed, closing symbol 91 of the control element only allows selection of a reduced line representation for sub-components 301, 302 and 303 and for component 300.

Figure 13B:
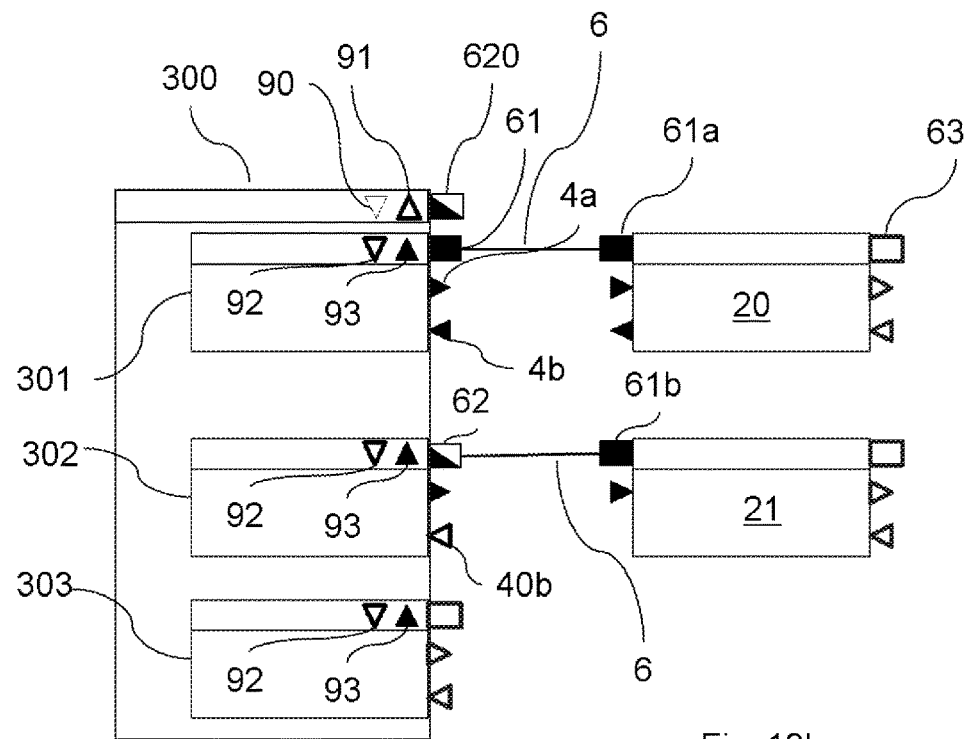
FIG. 13b shows the exemplary model of FIG. 13a with reduced line representation for the model sub-components.

FIG. 13b shows the model of FIG. 13a, but with reduced line representation for each of sub-components 301, 302 and 303. For these sub-components, it is now possible to switch from the reduced line representation of the sub-components back to the unfolded representation depicted in FIG. 13a using unfolding symbol 92, or to transfer the sub-component into a reduced component representation using closing symbol 93. As for component 300, it is still only possible to select a reduce line representation via closing symbol 91. In this representation, unfolding symbol 90 of model component 300 is not selectable and, therefore, continues to be represented with a thin border.

Figure 13C:
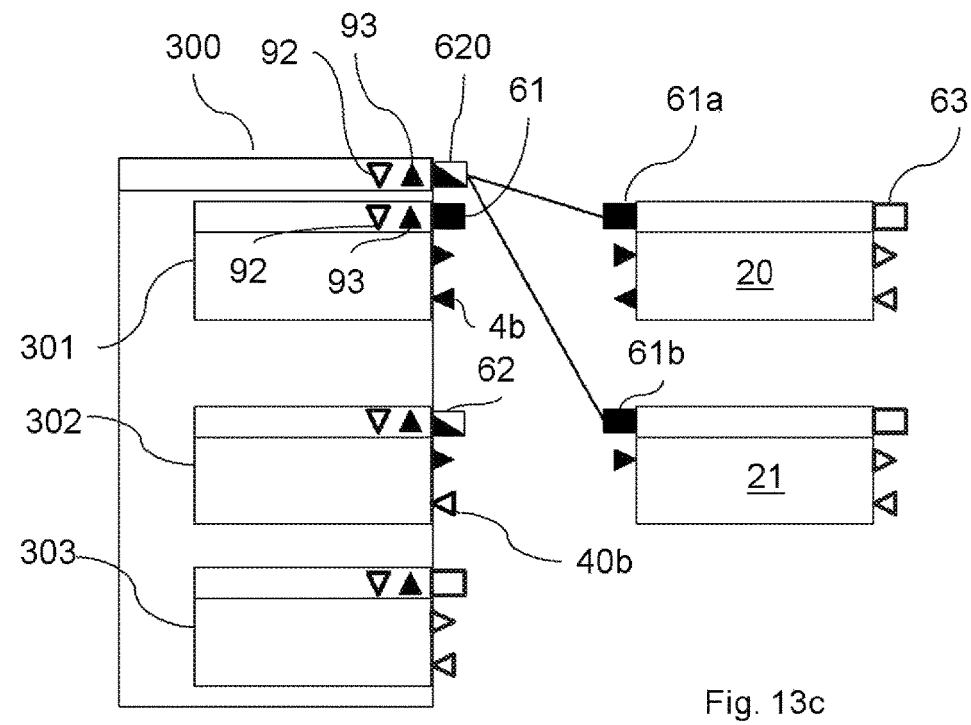
FIG. 13c shows the exemplary model of FIG. 13a with reduced line representation for the model component.

This does not change until a reduced line representation is also selected on the component level. FIG. 13c shows that then the control element of component 300 also allows unfolding of the line representation via unfolding symbol 92. In addition, closing symbol 93 of model component 300 now also allows closing of the component representation for this model component.

Figure 13D:
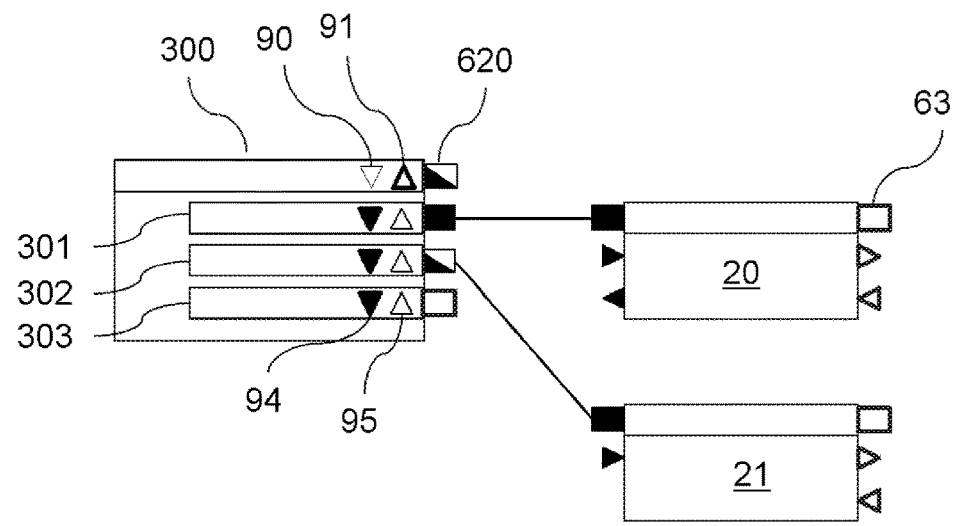
FIG. 13d shows the exemplary model of FIG. 13b, but additionally with the model sub-components in reduced component representation.

Starting from the representation in FIG. 13b, instead of further reducing the line representation on the component level, as shown in FIG. 13c, the representation may also be converted into a reduced component representation of sub-components 301, 302 and 303. Using closing symbols 93 of sub-components 301, 302 and 303 in FIG. 13b, it is possible to obtain the representation shown in FIG. 13d.

In this connection, the now filled unfolding symbol 94 symbolizes that it is only possible to select unfolding of the component representation for sub-components 301, 302 and 303. Closing symbol 95 is represented with only a thin border to illustrate that further closing is not selectable for sub-components 301, 302 and 303. This is different for the symbols of the control element of model component 300, which indicate that it is only possible to select closing of the lines via closing symbol 91.

Figure 13E:
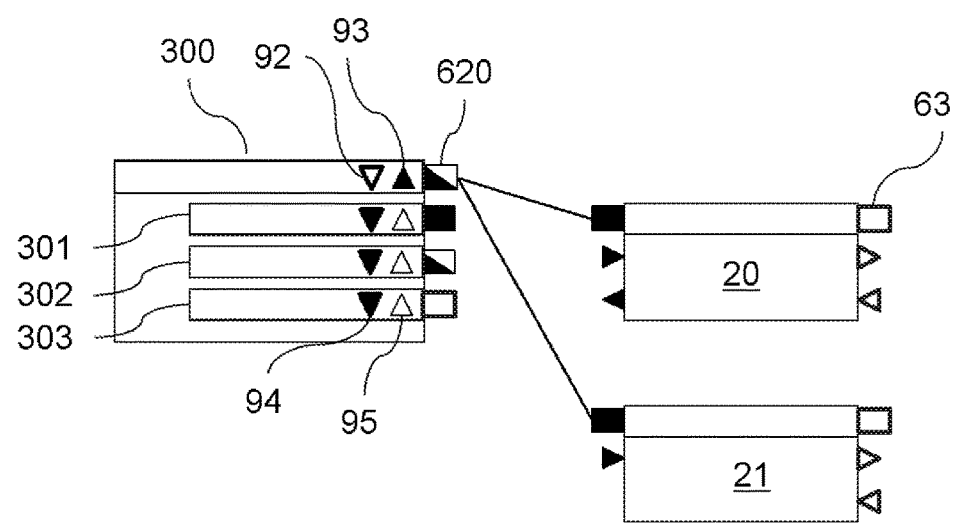
FIG. 13e shows the exemplary model of FIG. 13d with reduced line representation for the model component.

Such further closing of the lines on the level of the model component results in the representation shown in FIG. 13e.

Here, it is then only possible to further reduce the representation via closing symbol 93 of model component 300. Using unfolding symbol 92 of model component 300, the reduced line representation can be converted back to its previous, unfolded state.

Figure 13F:
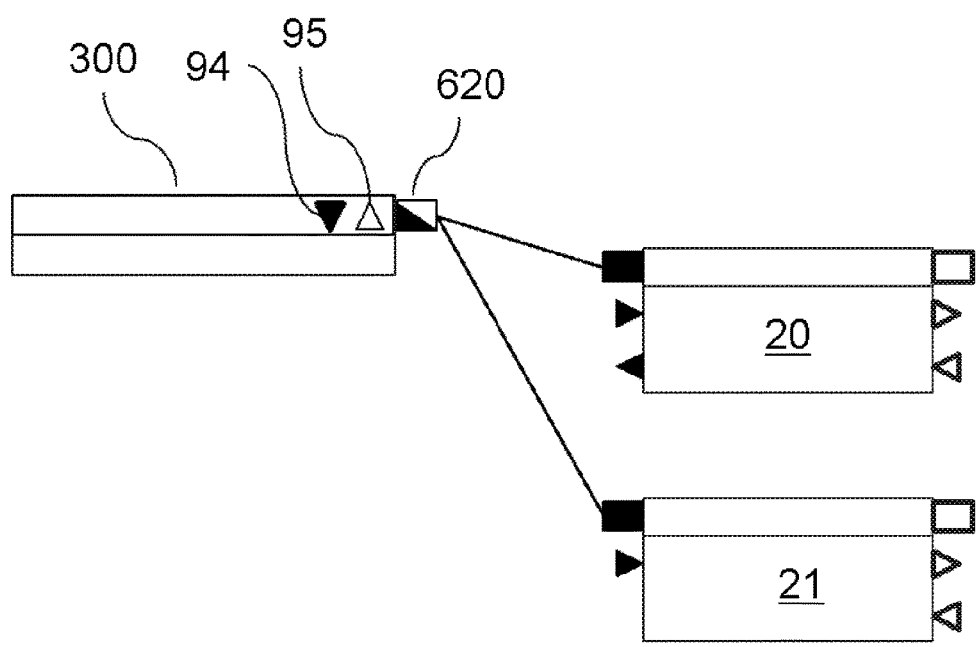
FIG. 13f shows the exemplary model of FIG. 13e, but additionally with reduced component representation for the model component.

Finally, FIG. 13f shows the representation for this model in a completely closed state, in which the thinly bordered closing symbol 95 of model component 300 again symbolizes that further closing is not possible, and in which it is only possible to select unfolding of the model component via unfolding symbol 94.

The implementation variants of the control elements illustrated in the model of FIG. 12 can also be used in the model of FIG. 13. The use of a slider as a control element is advantageous especially in the case of temporal coupling of the options for conversion from an expanded into a reduced line and a subsequent option for conversion from an expanded into a reduced component representation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Furthermore, in the claims the word "comprising" does not exclude other elements or steps. A single unit may fulfil the functions of several features recited in the claims. Any reference signs in the claims should not be construed as limiting the scope.

The invention claimed is:

1. A configuration tool, comprising;
   a tangible, non-transitory computer-readable medium having computer-executable instructions for configuring a model of a technical system and displaying the model on a display connected to a computer;
   wherein the model includes at least two model components, including a first model component having multiple ports;
   wherein the first model component is displayable in an expanded component representation and in a reduced component representation on the display, and wherein the first model component is displayable in an expanded line representation and in a reduced line representation on the display;
   wherein the first model component is displayable in the reduced line representation independently of whether the first model component is displayed in the expanded component representation or in the reduced component representation;
   wherein while the first model component is displayed in the expanded component representation with the expanded line representation, the multiple ports of the first model component are displayed and connections to the multiple ports of the first model component are represented by individual port association lines connected to the multiple ports of the first model component;

wherein while the first model component is displayed in the expanded component representation with the reduced line representation, the multiple ports of the first model component are displayed and connections to the multiple ports of the first model component are represented by a single component association line connected to a reduced port of the first model component; and wherein while the first model component is displayed in the reduced component representation with the reduced line representation, the multiple ports of the first model component are not displayed and connections to the multiple ports of the first model component are represented by the single component association line connected to a reduced port of the first model component.

2. The configuration tool of claim 1, wherein while the first model component is displayed in the reduced component representation with the expanded line representation, only ports of the multiple ports of the first model component having connections are displayed, and connections to the multiple ports of the first model component are represented by individual port association lines connected to the multiple ports of the first model component.

3. A configuration tool, comprising:
a tangible, non-transitory computer-readable medium having computer-executable instructions for configuring a model of a technical system and displaying the model on a display connected to a computer;
wherein the model includes at least two model components, including a first model component having multiple ports;
wherein the first model component is displayable in an expanded component representation and in a reduced component representation on the display, and wherein the first model component is displayable in an expanded line representation and in a reduced line representation on the display;
wherein the first model component is displayable in the reduced line representation independently of whether the first model component is displayed in the expanded component representation or in the reduced component representation;
wherein the first model component comprises a reduced port, the reduced port being represented in a first form in case that all ports of the multiple ports of the first model component are connected, in a second form when at least one port of the multiple ports of the first model component is not connected and at least one port of the model component of the multiple ports is connected, and in a third form when no port of the multiple ports of the model component is connected.

4. A configuration tool, comprising:
a tangible, non-transitory computer-readable medium having computer-executable instructions for configuring a model of a technical system and displaying the model on a display connected to a computer;
wherein the model includes at least two model components, including a first model component having multiple ports;
wherein the first model component is displayable in an expanded component representation and in a reduced component representation on the display, and wherein the first model component is displayable in an expanded line representation and in a reduced line representation on the display;
wherein the first model component is displayable in the reduced line representation independently of whether the first model component is displayed in the expanded component representation or in the reduced component representation;
wherein the first model component comprises a model sub-component having multiple ports, the model sub-component also being displayable in an expanded component representation and in a reduced component representation on the display, and in an expanded line representation and in a reduced line representation on the display independently of whether the model sub-component is displayed in the expanded component representation or in the reduced component representation.

5. The configuration tool of claim 4, wherein while the model sub-component is displayed in the reduced line representation for the at least one model sub-component, connections to the multiple ports of the model sub-component are represented by a single component association line connected to a reduced port of the model sub-component.

6. The configuration tool of claim 4, wherein while the model sub-component is displayed in the reduced line representation with the first model component displayed in the reduced line representation, connections to the multiple ports of the model sub-component are represented by a single component association line connected to a reduced port of the first model component.

7. The configuration tool of claim 4, wherein while the model sub-component is displayed in the expanded component representation with the first model component displayed in the expanded component representation, all of the multiple ports of the model sub-component are displayed and all of the multiple ports of the first model component are displayed.

8. The configuration tool of claim 4, wherein while the model sub-component is displayed in the reduced component representation with the model sub-component displayed in the expanded line representation, connected ports of the multiple ports of the model sub-component are displayed and unconnected ports of the multiple ports of the model sub-component are not displayed.

9. The configuration tool of claim 4, wherein while the model sub-component is displayed in the reduced component representation with the model sub-component displayed in the reduced line representation, all ports of the multiple ports of the model sub-component are not displayed.

10. The configuration tool of claim 4, wherein the first model component is displayable in the reduced component representation independently of whether the model sub-component is displayed in the expanded component representation or in the reduced component representation and in the expanded line representation or in the reduced line representation.

11. The configuration tool of claim 4, wherein while the first model component is displayed in the reduced component representation with the model sub-component is displayed in the expanded line representation, the model component is not displayed when the model component does not have any connected ports.

12. The configuration tool of claim 4, wherein while the first model component is displayed in the reduced component representation with the first model component is displayed in the reduced line representation, the model sub-component is not displayed.

* * * * *